United States Patent
Chen et al.

(10) Patent No.: US 12,090,648 B2
(45) Date of Patent: Sep. 17, 2024

(54) BIONIC SWEAT GLAND AND BIONIC SKIN

(71) Applicant: JIANGSU UNIVERSITY, Zhenjiang (CN)

(72) Inventors: Si Chen, Zhenjiang (CN); Lin Xu, Zhenjiang (CN); Jian Qu, Zhenjiang (CN); Chuanzhuang Yang, Zhenjiang (CN); Zhiheng Yang, Zhenjiang (CN); Kuo Li, Zhenjiang (CN); Weimin Ru, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/914,392

(22) PCT Filed: Sep. 15, 2021

(86) PCT No.: PCT/CN2021/118399
§ 371 (c)(1),
(2) Date: Mar. 16, 2023

(87) PCT Pub. No.: WO2023/035294
PCT Pub. Date: Mar. 16, 2023

(65) Prior Publication Data
US 2024/0009869 A1 Jan. 11, 2024

(30) Foreign Application Priority Data

Sep. 13, 2021 (CN) .......................... 202111068605.0
Sep. 13, 2021 (CN) .......................... 202111069897.X

(51) Int. Cl.
*B25J 19/00* (2006.01)
*F28D 15/04* (2006.01)

(52) U.S. Cl.
CPC ........ *B25J 19/0054* (2013.01); *F28D 15/046* (2013.01)

(58) Field of Classification Search
CPC .............. B25J 19/0054; F28D 15/0233; F28D 15/046; F28D 15/04; B60R 16/0232; B60I 2240/36
See application file for complete search history.

(56) References Cited

U.S. PATENT DOCUMENTS 11,535,360 B1 * 12/2022 Roper ..................... F28F 13/18
2003/0141045 A1 * 7/2003 Oh ........................ F28D 15/046
165/104.26

(Continued)

FOREIGN PATENT DOCUMENTS

CN 101210785 A 7/2008
CN 101600324 A 12/2009

(Continued)

OTHER PUBLICATIONS

Cheongcheon Lee, et al., Artificial Sweat Glands Based on Nanoclays and Thermoresponsive Hydrogels, Science of Advanced Materials, 2017, pp. 1377-1384, vol. 9, No. 8.

(Continued)

*Primary Examiner* — Tho V Duong
(74) *Attorney, Agent, or Firm* — Bayramoglu Law Offices LLC

(57) ABSTRACT

A bionic sweat gland and a bionic skin include a shell and a porous medium. A heat dissipation pipe is arranged inside the shell, that is filled with porous media. The pores formed by the porous medium in the heat dissipation pipe gradually decrease along the evaporation flow direction and the gap of the porous medium is filled with evaporation liquid. The shell is a permeable structure, which is used to absorb evaporation liquid from the environment. The top of the shell is provided with a number of through holes connected with the heat dissipation pipe for discharging evaporation liquid to the outside. The bionic sweat gland and the bionic (Continued)

skin can adapt to the effect of tensile and shear forces generated on the surface of flexible materials such as electronic skin during use.

20 Claims, 15 Drawing Sheets

(56) References Cited

U.S. PATENT DOCUMENTS

| | | | | |
|---|---|---|---|---|
| 2006/0162907 A1* | 7/2006 | Wu | ............ | F28D 15/046 |
| | | | | 165/146 |
| 2006/0283575 A1* | 12/2006 | Pai | ............ | F28D 15/046 |
| | | | | 165/104.26 |
| 2007/0193722 A1* | 8/2007 | Hou | ............ | F28D 15/0233 |
| | | | | 165/146 |
| 2014/0174085 A1* | 6/2014 | Kare | ............ | F01K 25/12 |
| | | | | 60/670 |
| 2019/0107333 A1* | 4/2019 | Niu | ............ | F28D 15/02 |
| 2020/0328137 A1* | 10/2020 | Lan | ............ | F28D 15/0266 |
| 2021/0262737 A1* | 8/2021 | North | ............ | H01L 23/427 |

FOREIGN PATENT DOCUMENTS

| | | |
|---|---|---|
| CN | 208012433 U | 10/2018 |
| CN | 208779995 U | 4/2019 |
| CN | 110062562 A | 7/2019 |
| CN | 111867318 A | 10/2020 |
| CN | 113226000 A | 8/2021 |
| WO | 2020041749 A1 | 2/2020 |

OTHER PUBLICATIONS

Anand K. Mishra, et al., Autonomic perspiration in 3D-printed hydrogel actuators, Science Robotics, 2020, pp. 1-9, vol. 5, eaaz3918.
Toyotaka Kozuki, et al., Skeletal Structure with Artificial Perspiration for Cooling by Latent Heat for Musculoskeletal Humanoid Kengoro, IEEE/RSJ International Conference on Intelligent Robots and Systems (IROS), 2016, pp. 2135-2140.

* cited by examiner

BIONIC SWEAT GLAND AND BIONIC SKIN

CROSS REFERENCE TO THE RELATED APPLICATIONS

This application is the national phase entry of International Application No. PCT/CN2021/118399, filed on Sep. 15, 2021, which is based upon and claims priority to Chinese Patent Application No. 202111068605.0, filed on Sep. 13, 2021; Chinese Patent Application No. 202111069897.X, filed on Sep. 13, 2021, the entire contents of which are incorporated herein by reference.

TECHNICAL FIELD

The present disclosure relates to the field of bionics or bionic skin, in particular to a bionic sweat gland and a bionic skin.

BACKGROUND

There are two main artificial skin types: synthetic and smart. Smart skin is an important research field in human-computer interaction and artificial intelligence. It also plays an essential role in the field of medical and health care.

At this stage, most components of the flexible sensor are made of flexible materials, except the electrode. Due to the complexity of the skin, a small local area often has a variety of functions, primarily sensory functions, such as feeling cold, hot, soft, and hard. Therefore, in recent years, the research ideas for bionic electronic skin have been to stack the skin and install different types of sensors in each layer of the skin. The existing technology discloses a multi-layer electronic skin. The first layer of skin is composed of a first hydrogel and a plurality of first sensors. The composition of the second layer of skin is similar to that of the first layer of skin. The outside of the first flexible hemispherical convex pressing plate and the outside of the second flexible hemispherical convex pressing plate in the second skin layer are directly opposite. The contact area of the flexible hemispherical convex pressing plate of the upper and lower skin is very small and can produce a response to external stimuli immediately. Therefore, the electronic skin provided by this scheme has high sensitivity. However, since the high-temperature environment will affect the performance and service life of electronic components and equipment. The traditional convection heat transfer method and forced air-cooling method relying on single-phase fluid have been difficult to meet the heat dissipation requirements of many electronic devices.

(Lee et al.) used nano clay and temperature-sensitive hydrogel to make bionic sweat glands, that not only realized the function of water evaporation cooling when the temperature was high but also realized the function of preventing water evaporation when the temperature was low. However, the bionic sweat glands with a micro-surface structure still have defects in stability, and implantability, especially in heat transfer efficiency.

Rob Shepherd of Cornell University and his research team developed a robot palm with special materials, that can control the machine's internal temperature by 'secreting sweat'. However, this bionic sweat gland, which uses sweating as the heat dissipation method, has some defects. In the heat exchange process, after the sweat is discharged, the external shell will become wet and slippery, reducing the friction of the artificial sweat gland, which is not conducive to grasping and may cause the objects in the hands to slide. Although changing the texture of the upper layer can alleviate this, it will make the appearance wrinkled. In addition, the robot needs a regular water supply to supplement the evaporated water. As a result, the heat dissipation method of simply draining and sweating changes with the opening size due to different temperatures, resulting in uncontrollable water output, so the stability of heat dissipation is uncontrollable. The water supply is discharged at once, and the discharged water during use cannot be collected and recycled. It will also change the surface state of the external palm, making the surface wet and slippery, which is not conducive to the process of grasping.

In the cooling mode of the Kengoro robot, researchers at Kyoto University in Japan adopted the bionic sweat gland to develop a more efficient coolant delivery system. Kengoro is equipped with an aluminum frame with sponge-like gaps and channels. These channels can transfer water to the whole body of the robot and realize heat exchange in the form of evaporation. The cooling system based on the aluminum frame perspires like human beings. Tests show that this sweating technique is twice as effective as the traditional cooling method. This micro-surface structure is rigid and placed inside the robot, which is not conducive to the robot's whole-body installation, skin coverage, evaporation of a liquid to the air.

SUMMARY

In view of the shortcomings in the existing technology, the present disclosure provides a bionic sweat gland and bionic skin, which can adapt to the effect of tensile and shear forces generated on the surface of flexible materials such as electronic skin during use. Compared with the existing hardware type heat exchange method relying on the convection heat exchange method of single-phase fluid and the forced air-cooling method, the heat exchange method with the flexible characteristics of the device has a better adaptability and more applications.

The present disclosure achieves the above technical object through the following technical means.

A bionic sweat gland includes a shell and a porous medium;

The heat dissipation pipe is arranged inside the shell. The heat dissipation pipe is filled with porous media. The pores formed by the porous medium in the heat dissipation pipe gradually decrease along the evaporation flow direction; the gap of the porous medium is filled with evaporation liquid; the shell is a permeable structure used to suck evaporation liquid from the environment; the top of the shell is provided with a plurality of through-holes communicating with the heat dissipation pipe for discharging the evaporation liquid to the outside.

Further, the porous medium is hydrogel particles; the diameter of the hydrogel particles gradually decreases along the evaporation flow direction; the pore formed by the porous medium is no more than 40 μm.

Further, the shell is in a water drop shape, the bottom of the shell is spherical in a water drop shape, and the top of the shell gradually shrinks along the evaporation flow direction.

Further, the shell is a double-layer permeable structure. The shell includes a permeable inner layer and a permeable outer layer; the permeable inner layer and the permeable outer layer are both grid structures; the mesh pore of the permeable inner layer is smaller than the minimum diameter of the porous medium; the mesh pores of the permeable outer layer are larger than those of the permeable inner layer, and the mesh of the permeable inner layer is staggered.

Furthermore, a filter screen is arranged between the heat dissipation pipe and the through-hole on the top of the shell.

Furthermore, it also includes an end cover; the top of the shell is installed with an end cover, lots of micro heat pipes are distributed inside the end cover, and one end of the micro heat pipe is communicated with a through-hole on the top of the shell; the other end of the micro heat pipe is communicated with the outside.

Further, the end cover is a flat oval, and a number of the micro heat pipes are distributed in the end cover according to Murray's law.

The present disclosure relates to a bionic skin, where the bionic sweat gland is implanted in the bionic skin.

Further, the bionic skin wraps the shell, and the through-hole on the top of the shell is located outside the bionic skin; the bionic skin is provided with the main pipe, which is used to supplement the evaporation liquid inside the bionic skin near the bionic sweat gland; the shell absorbs the evaporation liquid from the interior of the bionic skin.

Further, the shell of the bionic sweat gland communicates with a nearby main pipe through a liquid adding thin pipe.

A bionic sweat gland includes an end cover, a micro heat pipe, a return pipe, and a shell.

The end cover and the shell are sealed and connected through a seam, and the center of the end cover is provided with a liquid inlet cavity. A number of micro heat pipes are distributed inside the end cover, and one end of any micro heat pipe is connected with the liquid inlet cavity. A heat dissipation pipe communicated with the liquid inlet cavity is arranged inside the shell. The heat dissipation pipe is filled with porous media, and the pores formed by the porous medium in the heat dissipation pipe gradually decrease along the evaporation flow direction. The gap of the porous medium is filled with evaporation liquid. The other end of the micro heat pipe is communicated with the heat dissipation pipe through a return pipe.

Further, the porous medium is hydrogel particles; the diameter of the hydrogel particles gradually decreases along the evaporation flow direction; the pore formed by the porous medium is no more than 40 μm.

Further, the end cover is a flat oval, and several micro heat pipes are distributed in the end cover according to Murray's law.

Further, a filter screen is arranged between the heat dissipation pipe and the liquid inlet chamber.

Furthermore, the shell is in the shape of water drops, and the bottom of the shell is spherical in the shape of water drops; the top of the shell gradually shrinks along the evaporation flow direction.

Furthermore, the shell is a cylinder or a cuboid.

Furthermore, the shell is a spiral structure or a coil structure.

The present disclosure relates to a bionic skin, where the bionic sweat gland is implanted in the bionic skin.

Further, when the heat source on the bionic skin is point distributed, the bionic sweat glands are uniformly distributed around the point heat source; when the heat source on the bionic skin is surface distributed, the bionic sweat gland array is uniformly distributed on the surface heat source plane.

Further, the shell of the bionic sweat gland is bonded or woven and fixed on the interior or surface of the bionic skin; the end cover is located outside the bionic skin.

Advantages of the present disclosure include:
1. The bionic sweat gland of the present disclosure, the end cover, can enlarge the heat dissipation area. Due to the recyclable way of evaporative condenser, the end cover can enlarge the heat dissipation area. The evaporation of the end cover is based on the evaporation principle of the micro heat pipe so that the condensed liquid circulates in one direction and flows back to the bottom heat absorption zone through the shell.
2. The bionic sweat gland of the present disclosure, the shell, and the end cover are made of hydrogel material, which can adapt to the effect of tensile and shear forces generated on the surface of flexible materials such as electronic skin during use. Compared with the existing hardware type heat exchange method relying on the convection heat exchange method of single-phase fluid and the air forced cooling method, the heat exchange method with the flexible characteristics of the device has better adaptability and more applications.
3. The bionic sweat gland of the present disclosure, has a shell filled with porous media, and the pores formed by the inner porous media gradually decrease along the evaporation direction. Porous media itself is infiltrative, and can effectively absorb evaporation liquid so as to achieve solid-liquid equilibrium and change the fluidity of an internal liquid. The porous medium filled inside can spontaneously transport the absorbed liquid from the evaporating end to the condensing end.
4. The bionic sweat gland of the present disclosure, the micro-dense arrangement of multiple numbers per unit area, can be adopted, and the number of sweat glands per unit density at the heat source and its surrounding area is more than that at the skin without a heat source. When applied to the receptor surface area, the larger the area of smart skin, the more sweat glands there are. Compared with the traditional large-scale single fixed area cooling mode, the high-density mode with a small number of structures is adopted.

Figure 1:
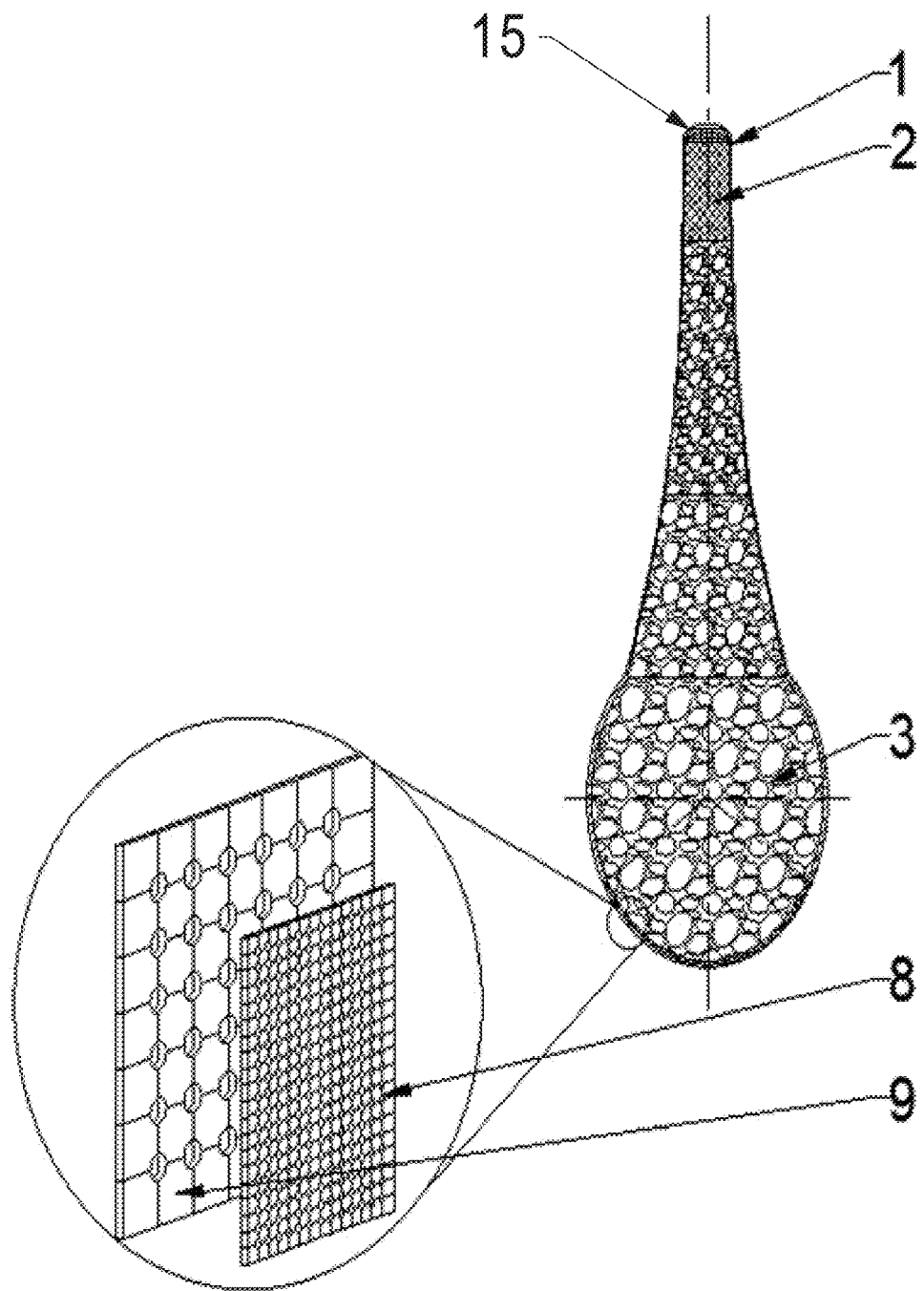
FIG. 1 is the structural diagram of the bionic sweat gland described in embodiment 1 of the present disclosure.

In the figures: 1. Shell; 2. Strainer; 3. Porous medium; 4. End cover; 5. Liquid filling thin pipe; 6. Main pipeline; 7. Bionic skin; 8. Permeable inner layer; 9. Permeable outer layer; 10. Woven material; 11. Adhesive substance; 12. Return pipeline; 13. Micro heat pipe; 14. Liquid inlet chamber.

DETAILED DESCRIPTION OF THE EMBODIMENTS

The present disclosure will be further described below in combination with the accompanying drawings and specific embodiments, but the scope of protection of the present disclosure is not limited to this.

Embodiments of the present disclosure are described in detail below, examples of which are shown in the accompanying drawings, where the same or similar reference numerals throughout represent the same or similar elements or elements having the same or similar functions. The embodiments described below by reference to the accompanying drawings are exemplary and are intended to explain the present disclosure but are not to be understood as limiting the present disclosure.

In the description of the present disclosure, it should be understood that the terms indicating the azimuth or positional relationship are based on the azimuth or positional relationship shown in the drawings, such as "center", "longitudinal", "transverse", "length", "width", "thickness", "upper", "lower", "axial", "radial", "vertical", "horizontal", "inner" and "outer". It is only for the convenience of describing the present disclosure and simplifying the description, rather than indicating or implying that the device or element must have a specific orientation, be constructed and operated in a specific orientation, so it cannot be understood as a limitation of the present disclosure. In addition, the terms "first" and "second" are used only for descriptive purposes and cannot be understood as indicating or implying relative importance or implicitly indicating the number of indicated technical features. Thus, the features defined as "first" and "second" may explicitly or implicitly include one or more features. In the description of the present disclosure, "multiple" means two or more unless otherwise specifically defined.

In the present disclosure, unless otherwise expressly specified and defined, the terms 'installation', 'connection', 'fixation', and other terms shall be understood in a broad sense. For example, it may be a fixed connection, a detachable connection, or an integral connection. It can be a mechanical connection or an electrical connection; It can be directly connected or indirectly connected through an intermediate medium, and it can be the connection between two components. For those skilled in art, the specific meaning of the above terms in the present disclosure can be understood according to specific circumstances.

FIG. 1 shows the bionic sweat gland described in embodiment 1 of the present disclosure, including the shell 1 and porous media 3; shell 1 forms a heat dissipation pipe, and the heat dissipation pipe is filled with porous media 3, the pores formed by the porous medium 3 in the heat dissipation pipe gradually decrease along the evaporation flow direction; the gap of the porous medium 3 is filled with evaporation liquid; the shell 1 is a water-permeable structure, which is used to suck evaporation liquid from the environment; the shell 1 is a water drop like structure that gradually expands from top to bottom. The slender and narrow area at the upper part of shell 1 is called the condensation end, and the expanded area at the lower part of shell 1 is called the evaporation end. Shell 1 gradually expands to have more thermal contact area and fully absorb heat. The temperature difference between the simulated sweat gland and the air is cold; the internal gas expands under high temperatures and generates a pressure difference with the external environment. The slender structure on the upper part of the condensing end can amplify the generated internal and external pressure difference, and the completion of heat exchange can be accelerated at the outlet of the condensing end.

Shell 1 is a double-layer permeable structure; shell 1 includes a permeable inner layer 8 and a permeable outer layer 9; the permeable inner layer 8 and the permeable outer layer 9 are both grid structures; the mesh pore of the permeable inner layer 8 is smaller than the minimum diameter of the porous medium 3, which is used to prevent the exposed sweat glands of the porous medium 3 and also plays the role of filtration; the mesh pores of the permeable outer layer 9 are larger than those of the permeable inner layer 8, and the mesh of the permeable inner layer 8 and the mesh of the permeable outer layer 9 are staggered. The top of shell 1 is provided with a plurality of through-holes communicating with the heat dissipation pipe for discharging the evaporation liquid to the outside. The heat dissipation pipe is filled with porous medium 3; the pores formed by the porous medium 3 in the heat dissipation pipe gradually decrease along the evaporation flow direction; the gap of the porous medium 3 is filled with evaporation liquid; the bottom of the expansion area at the lower part of the housing 1 is the bottom of the heat dissipation pipe. The porous medium 3 can be hydrogel particles; the diameter of the hydrogel particles gradually decreases along the evaporation flow direction; the pore formed by the porous medium 3 is no more than 40 μm. Porous media have wettability, which can effectively absorb evaporation liquid so as to achieve solid-liquid equilibrium and change the fluidity of an internal liquid. The porous medium 3 filled in the heat dissipation pipe can spontaneously transport the absorbed liquid along the direction from the evaporation end to the condensation end and transfer the evaporation liquid to the through-hole on the top of the shell 1. The shell structure of the present disclosure has water permeability, the evaporation of porous medium 3, and the opening of shell 1, which makes the device have better adsorption on the evaporation liquid and strong adsorption force and allows the evaporation liquid to enter the device from the outside. Shell 1 is made of hydrogel. The shape of the hydrogel changes with the surface tension to adapt to the flexible state of elastic and soft skin. Shell 1 is a double-layer water-permeable structure, which can supplement the evaporation liquid in the case of multiple liquids in the external environment. The porous medium 3 inside can spontaneously transport the absorbed liquid along the direction from the evaporation end to the condensation end, transfer the liquid to the top filter screen near the slender port on the upper part of the outer shell, and then complete the heat exchange in the form of steam. A strainer 2 is arranged between the heat dissipation pipe and the through-hole 15 on the top of shell 1. To sum up, on the premise that the shell 1 of embodiment 1 serves the protection and planting convenience, the water permeability at the bottom of the evaporation end of the shell 1 can spontaneously absorb the evaporation liquid from the surrounding multi-liquid environment; porous medium 3 is filled in the heat dissipation pipe to provide internal evaporation liquid circulation power; the temperature difference caused by the internal temperature being higher than the external air temperature causes the internal pressure of the simulated sweat gland to be higher than the external pressure, which speeds up the completion of gas-liquid exchange and can spontaneously complete the whole process of heat exchange.

Figure 2:
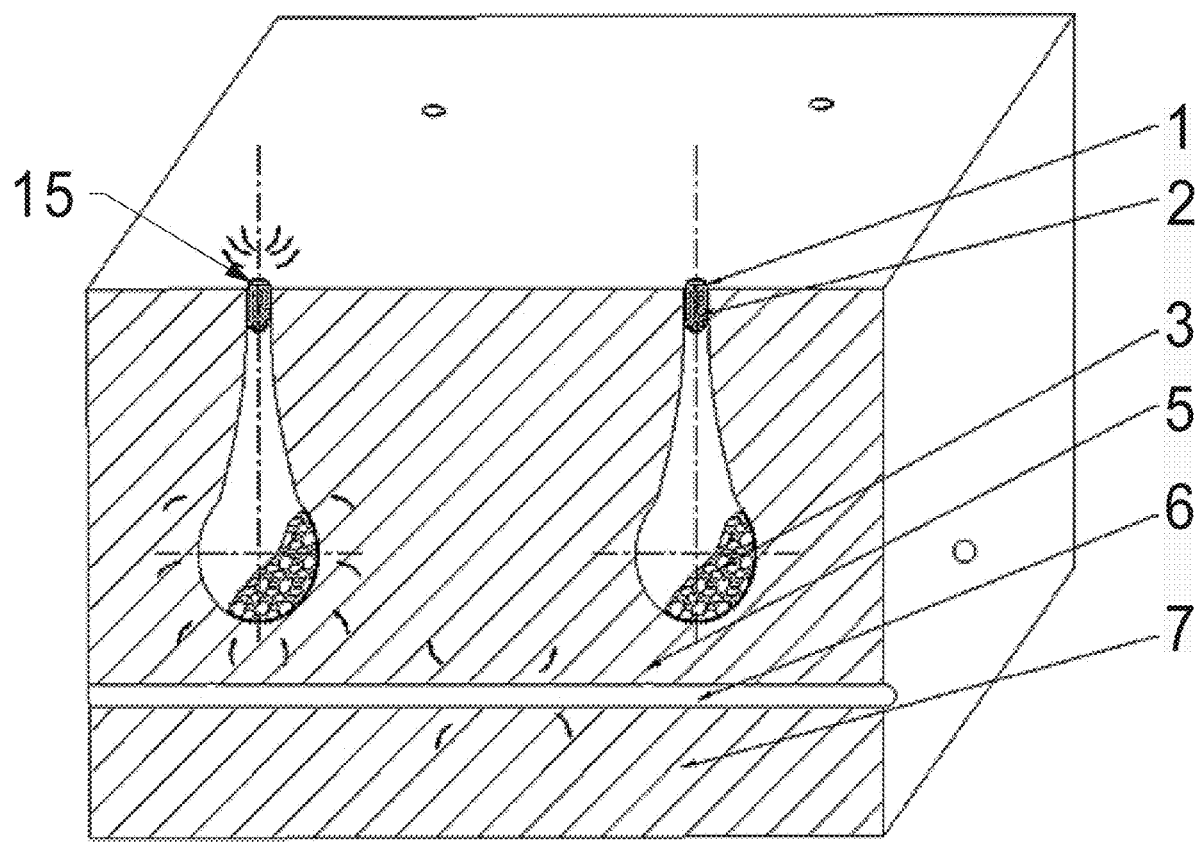
FIG. 2 is the distribution of embodiment 1 on the bionic skin.

In a bionic skin, the bionic sweat gland described in embodiment 1, is implanted into the bionic skin, as shown in FIG. 2. Bionic sweat gland working environment in bionic skin 7, and the material of bionic skin 7 is a hydrogel, which conforms to the soft and watery state of human skin. The working model of bionic sweat glands is open heat exchange, and the evaporation liquid is directly discharged out of the body as a heat exchange medium, which cannot be recycled. The shell 1 of the bionic sweat gland is in contact with the bionic skin 7 and is planted inside the bionic skin 7, and the bionic skin 7 completely wraps the evaporation end of the shell 1. The through-hole 15 on the top of shell 1 is located outside the bionic skin 7. The structure of shell 1 is similar to that of the bionic skin 7, which can effectively exchange liquid and absorb evaporation liquid into the surrounding multi-liquid area to supplement the bionic sweat glands. The bionic skin 7 is provided with a main pipeline 6, which is used to supplement the evaporation liquid inside the bionic skin 7 in the area near the bionic sweat gland; the shell 1 absorbs the evaporation liquid from the interior of the bionic skin 7. The main pipeline 6 is the liquid replenishment pipe of the bionic skin 7. The evaporation liquid flows through the main pipeline 6 and diffuses into the bionic skin 7 to replenish the evaporation liquid lost by the bionic skin 7 due to evaporation. The porous medium 3 of the bionic sweat gland absorbs the evaporation liquid component of the hydrogel through shell 1, transports it along the direction from the evaporation end to the condensation end, and discharges it into the air through the filter screen. The bionic skin 7 has a large area. With the modular idea of a sweat gland device in a large area of bionic skin, one main pipeline 6 can supply the liquid required by multiple bionic sweat glands so that the bionic skin within a certain range along the main pipeline 6 remains soft and watery. Therefore, for the use of bionic skin 7 with a large area, multiple main pipelines 6 are usually used for continuous liquid supply to supplement the evaporation liquid during the discharge of bionic sweat glands.

Figure 3:
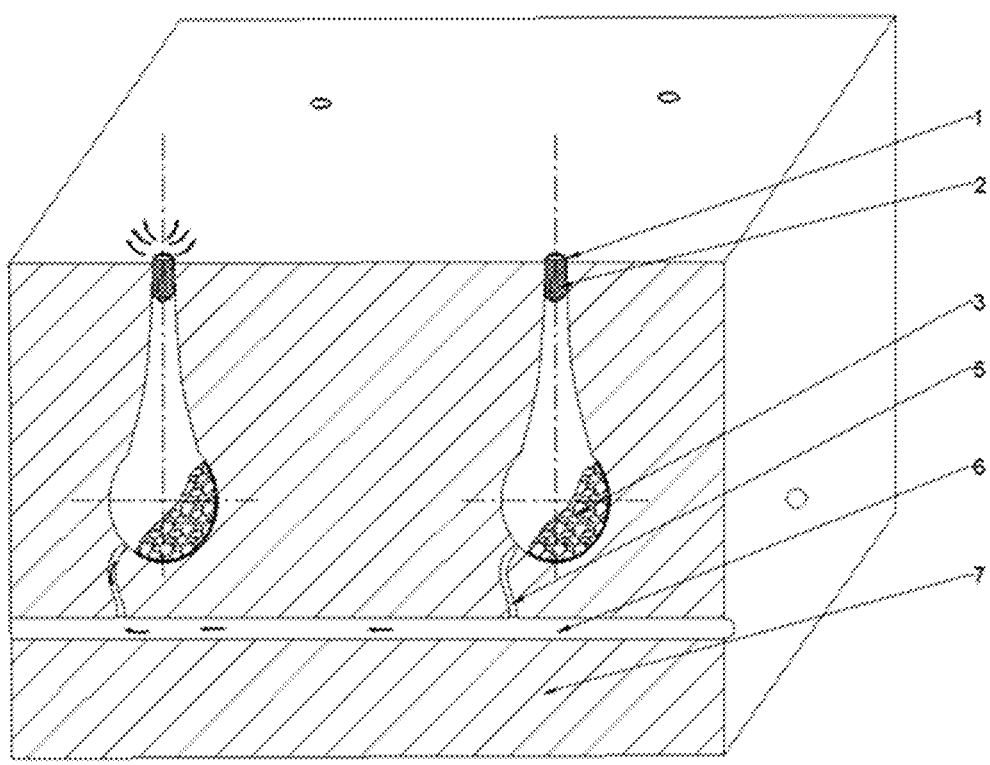
FIG. 3 is a distribution diagram of embodiment 1 on a bionic skin with a thin liquid adding tube.

As shown in FIG. 3, in order to improve the heat exchange efficiency of sweat glands, a liquid filling thin pipe 5 is added on the basis of implanting the bionic sweat glands described in embodiment 1 in the bionic skin. The shell 1 of the bionic sweat gland communicates with a nearby main pipeline 6 through a liquid-filled thin pipe 5. Continuously pressurize the liquid in the main pipeline 6, accelerate the speed of the liquid entering the porous medium area, and increase the pressure difference between the bottom of the device and the external air. The pressurized liquid can directly flow through the interior of shell 1 through the liquid filling thin pipe 5, which can quickly pass through the working path, filter and refine the coolant through the filter screen, and complete the heat dissipation process.

Figure 4:
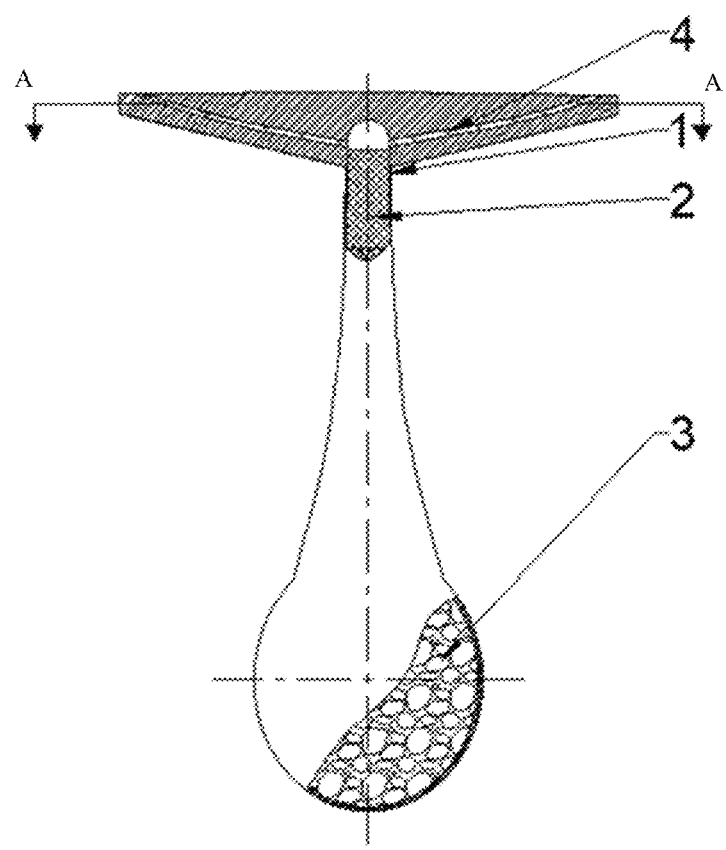
FIG. 4 is the structural diagram of the bionic sweat gland described in embodiment 2 of the present disclosure.
Figure 5:
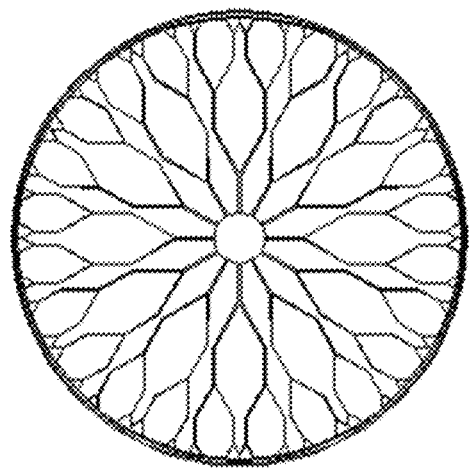
FIG. 5 is the micro heat pipe distribution diagram according to the present disclosure.

FIG. 4 shows the bionic sweat gland described in embodiment 2 of the present disclosure. On the basis of embodiment 1, the end cover 4 is also included. The end cover 4 is installed on the top of the shell 1, a number of micro heat pipes are distributed inside the end cover 4, and one end of the micro heat pipe 13 is communicated with a through-hole on the top of the shell 1; The other end of the micro heat pipe 13 is communicated with the outside. The purpose of the end cover 4 is to make better use of the evaporation heat dissipation process to take away more heat by increasing the channel distance at the condensation end so as to improve the heat dissipation utilization. The center of the end cover 4 is matched with the top of shell 1. A number of micro heat pipes 13 are distributed inside the end cover 4. One end of the micro heat pipe 13 communicates with a through-hole on the top of shell 1. Several of the micro heat pipes 13 are distributed in the end cover 4 according to Murray Murray's law, as shown in FIG. 5.

Figure 6:
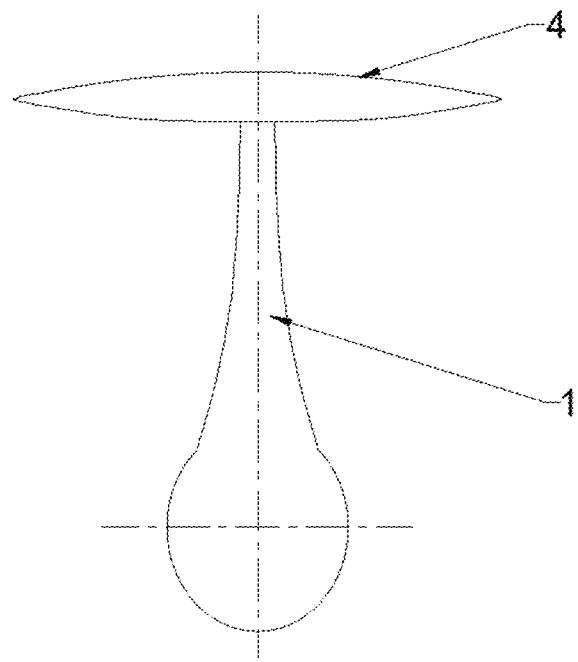
FIG. 6 is the bionic sweat gland structure diagram described in embodiment 3 of the present disclosure.
Figure 7:
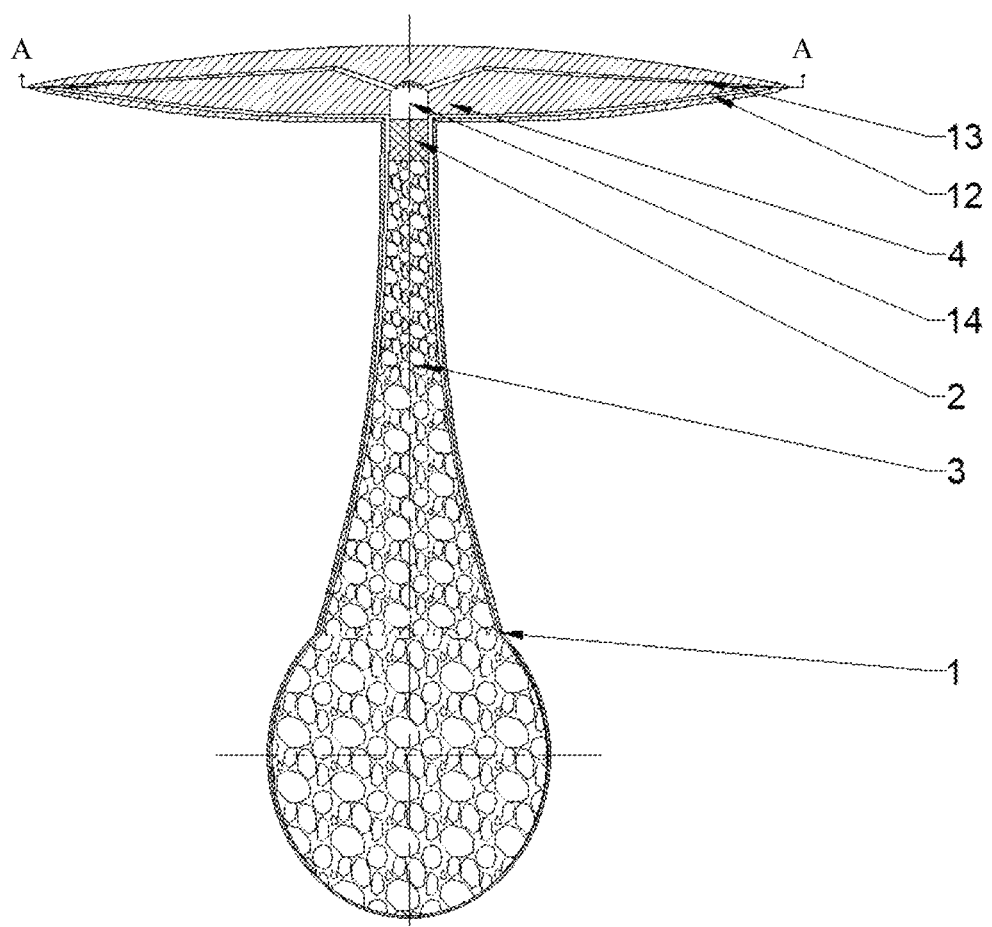
FIG. 7 is a sectional view of FIG. 6.

FIG. 6 and FIG. 7 are the bionic sweat glands described in embodiment 3 of the present disclosure, including the shell 1, a strainer 2, porous medium 3, end cover, liquid filling thin pipe 5, return line 12, micro heat pipe 13, and liquid inlet chamber 14. Shell 1 and the end cover 4 are sealed and connected through a seam. The end cover 4 is a flat oval structure, which is the heat dissipation end of the sweat gland device. The flat and wide structure is conducive to increasing the heat dissipation area. The center of the end cover 4 is provided with a liquid inlet chamber 14. A number of micro heat pipes 13 are distributed inside the end cover 4, and one end of any micro heat pipe 13 is connected to the liquid inlet chamber; Several of the micro heat pipes 13 are distributed in the end cover 4 according to Murray Murray's law, as shown in FIG. 5. The upper surface of the end cover 4 is in an arc shape from the middle-high to both sides low, and a deep hole is arranged in the middle of the end cover 4. The deep hole is the liquid inlet chamber 14. There are several small holes in the liquid inlet chamber 14 for the inlet of the micro heat pipe 13. The end cover 4 and shell 1 are positioned by uniformly distributed cylindrical pins, which can prevent the end cover 4 and shell 1 from rotating. Shell 1 is a water drop-like structure that gradually expands from top to bottom, and it gradually can have more thermal contact area and fully absorb heat. The inner part of shell 1 is provided with a heat dissipation pipe communicated with the liquid inlet chamber 14. The heat dissipation pipe is filled with porous media 3. The pores formed by the porous medium 3 in the heat dissipation pipe gradually decrease along the evaporation flow direction; the gap of the porous medium 3 is filled with evaporation liquid; the other end of the micro heat pipe 13 is communicated with the bottom of the heat dissipation pipe through a return pipeline 12. The connection surface between shell 1 and the end cover 4 is set as the upper part, and the bottom of the expansion area at the lower part of shell 1 is the bottom of the heat dissipation pipe. The evaporation liquid flows out of the micro heat pipe 13 and into the porous medium 3 at the bottom of the heat dissipation pipe through the return pipeline 12. The porous medium 3 can be hydrogel particles; the diameter of the hydrogel particles gradually decreases along the evaporation flow direction; the pore formed by the porous medium 3 is no more than 40 μm. Porous media have wettability, which can effectively absorb evaporation liquid so as to achieve solid-liquid equilibrium and change the fluidity of an internal liquid. The porous medium 3 filled in the heat dissipation pipe can spontaneously transport the absorbed liquid along the direction from the evaporation end to the condensation end, transfer the evaporation liquid to the liquid inlet chamber 14, and then complete the heat exchange through the micro heat pipe 13. Shell 1 is made of hydrogel, etc. Shell 1 and the end cover 4 are connected in a sealed manner, and there is no gap and liquid leakage during use. In the sealed state, volatile evaporation liquid is added to the sweat gland and evaporated to the upper-end cover of the condensation section after heat absorption by porous media. The evaporation liquid is condensed and refluxed to complete the recyclable heat exchange.

Figure 8:
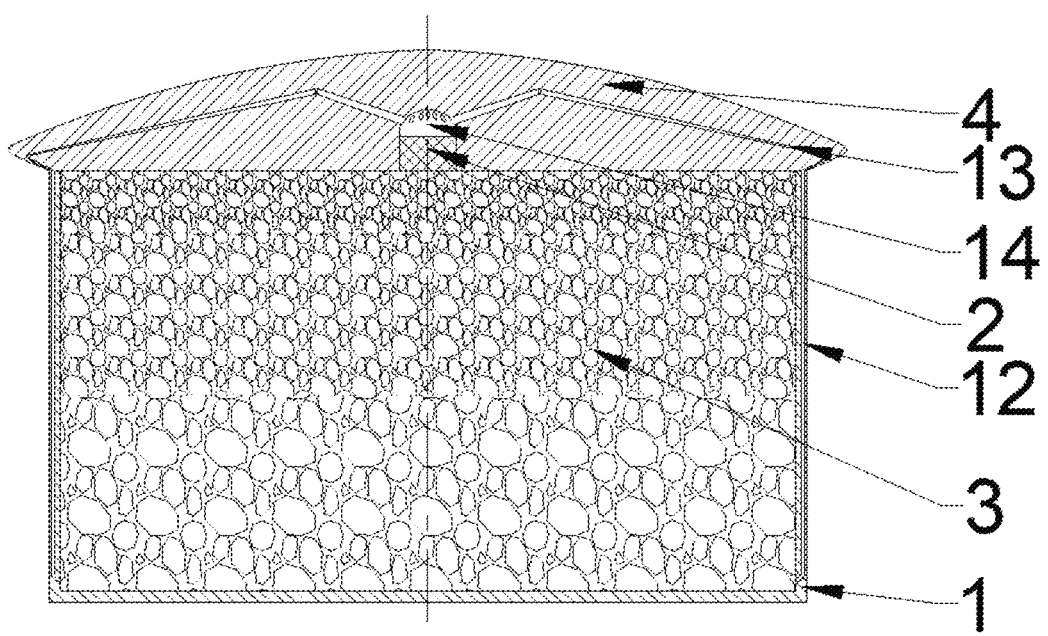
FIG. 8 is the structural diagram of the bionic sweat gland described in embodiment 4 of the present disclosure.

FIG. 8 shows the bionic sweat gland described in embodiment 4 of the present disclosure. Shell 1 is a cylinder or a cuboid. Shell 1 is a simple geometric structure that aims to facilitate the bionic sweat glands planted in the bionic skin 7. Other features are the same as those in embodiment 1.

Figure 9:
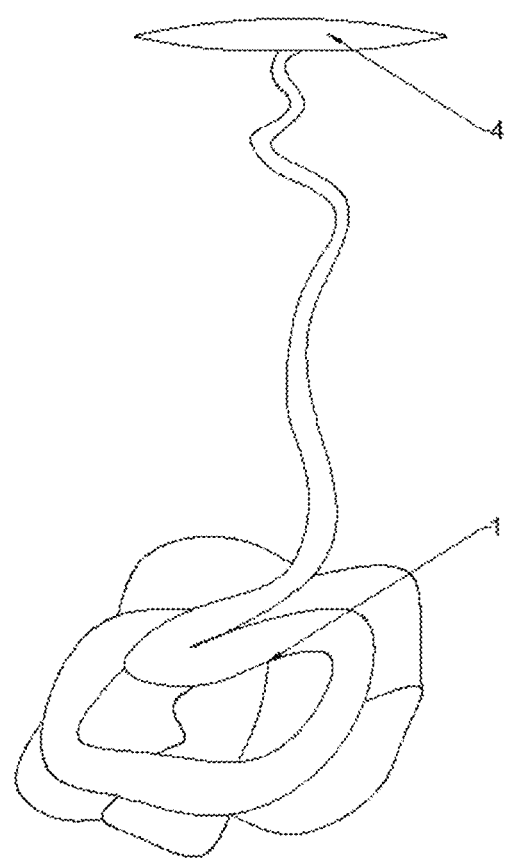
FIG. 9 is the bionic sweat gland structure diagram described in embodiment 5 of the present disclosure.

FIG. 9 shows the bionic sweat gland described in embodiment 5 of the present disclosure. Shell 1 can also adopt a coiled tubular polymer structure. The coiled tubular polymer structure increases the surface area of the evaporation end, and the evaporation end is fully in contact with the external bionic skin 7. Effective heat absorption can speed up the heat exchange, improving heat dissipation efficiency. This is the physiological and anatomical structure of the bionic sweat gland, and other features are the same as those in embodiment 3.

Figure 10:
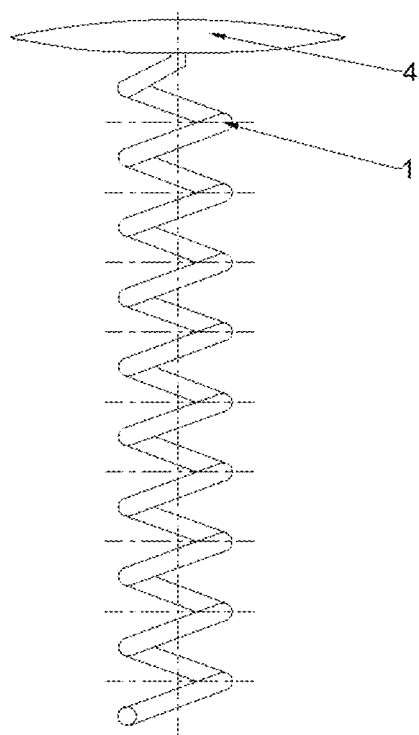
FIG. 10 is the bionic sweat gland structure diagram described in embodiment 6 of the present disclosure.

FIG. 10 shows the bionic sweat gland described in embodiment 6 of the present disclosure. Shell 1 adopts a spiral structure from top to bottom. Shell 1 with a spiral structure increases the surface area of the evaporation end, and the evaporation end fully contacts with the external bionic skin 7, so as to improve the heat dissipation efficiency. Other features are the same as those of embodiment 5.

Figure 11:
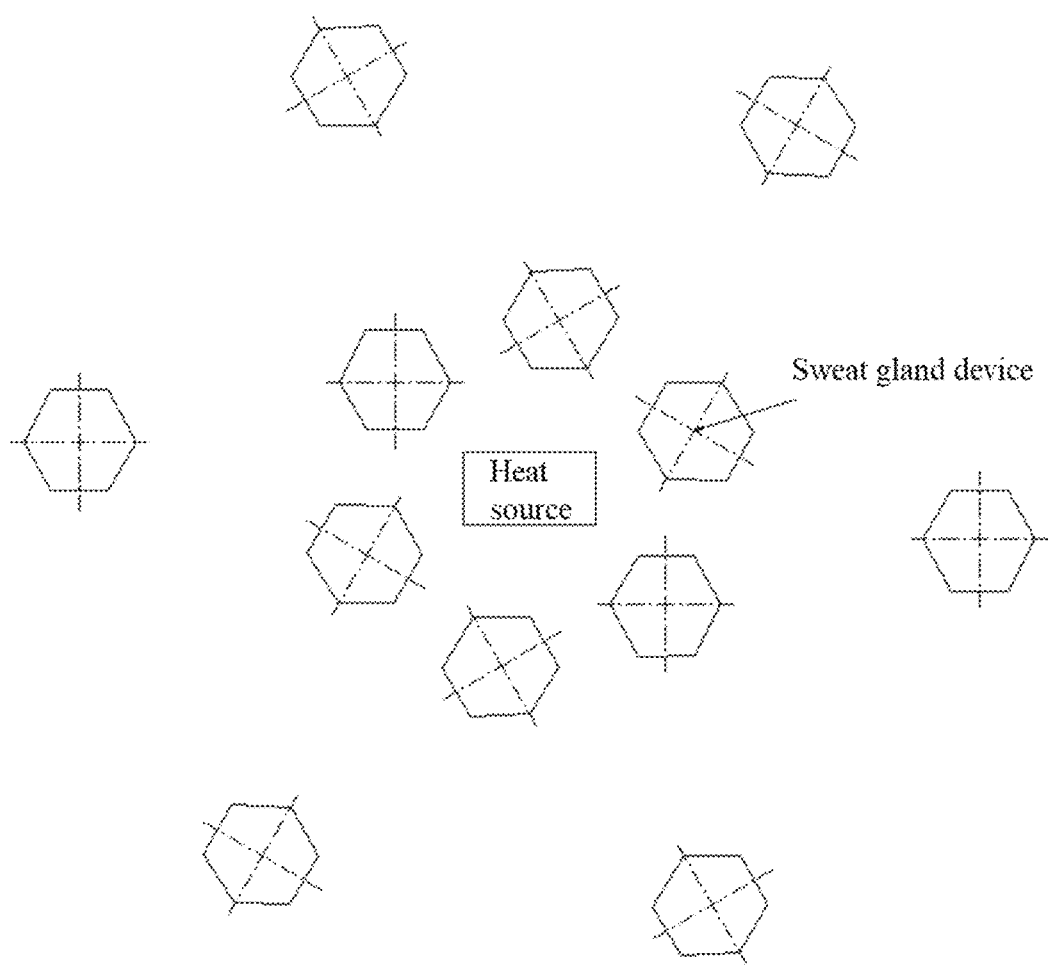
FIG. 11 is the distribution diagram of the bionic sweat glands of the present disclosure on the bionic skin of the point heat source.

The present disclosure relates to a bionic skin, where the bionic skin is implanted with the portable micro bionic sweat gland with flexible characteristics. In general, the heat sources of bionic skin 7 are unevenly distributed according to the distribution of sensors inside the bionic skin 7. Therefore, the arrangement and distribution of sweat glands in the skin must be based on specific rules. Generally, the distribution of heat sources can be divided into point heat sources and surface heat sources. As shown in FIG. 11, when the heat source on the bionic skin is point distributed, the bionic sweat glands are uniformly distributed around the point heat source; The bionic sweat glands form a circular distribution from near to far around the point heat source. The distribution density is adjusted according to the distance from the heat source. The farther the bionic sweat glands are from the point heat source, the sparser sweat gland devices' density.

Figure 12:
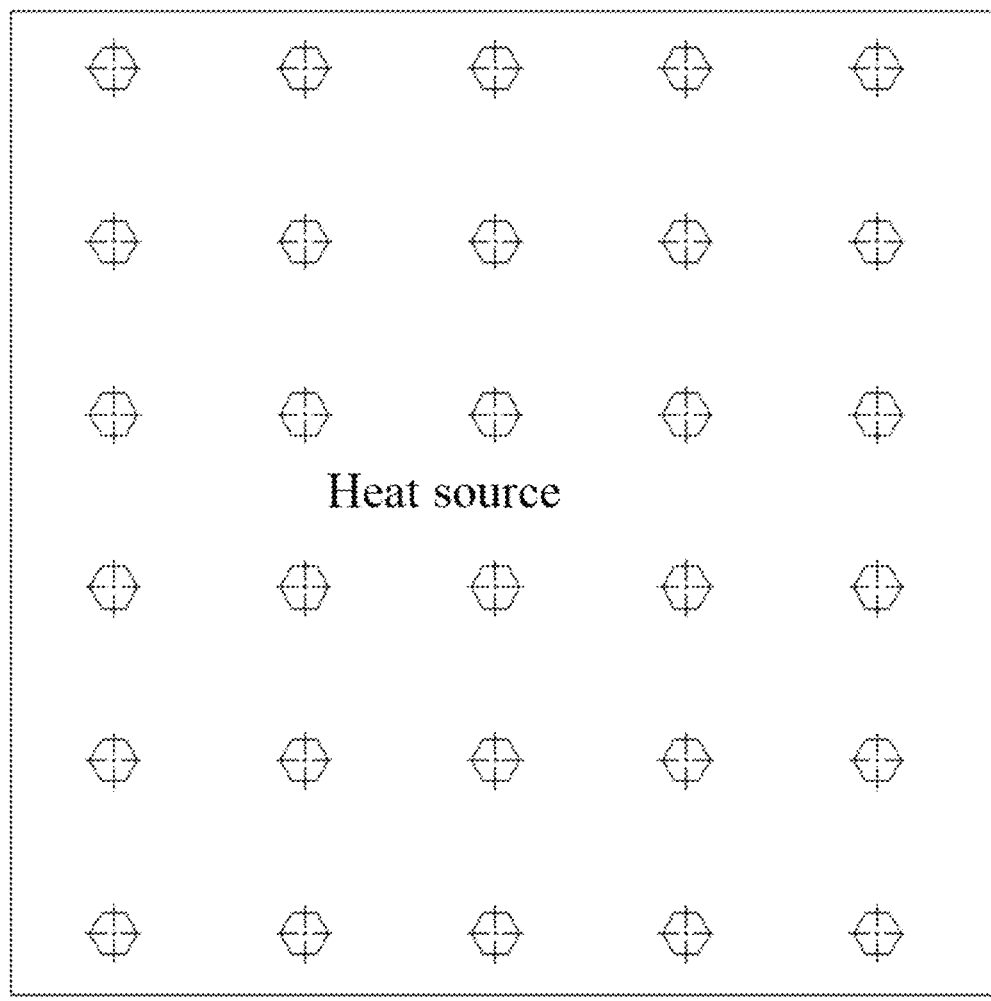
FIG. 12 is the distribution diagram of the bionic sweat glands described in the present disclosure on the bionic skin of the surface heat source.

As shown in FIG. 12, when the heat sources on the bionic skin are surface distributed, the bionic sweat gland array is uniformly distributed on the surface heat source plane. The bionic sweat gland distribution under the surface heat source simulates the sweat gland distribution in the local skin tissue. The present disclosure proposes distributing above the surface heat source in a matrix arrangement. The matrix arrangement and distribution can make multiple sweat gland devices uniformly heated and distribute the heat to each sweat gland device, thereby increasing the heat dissipation efficiency.

Figure 13:
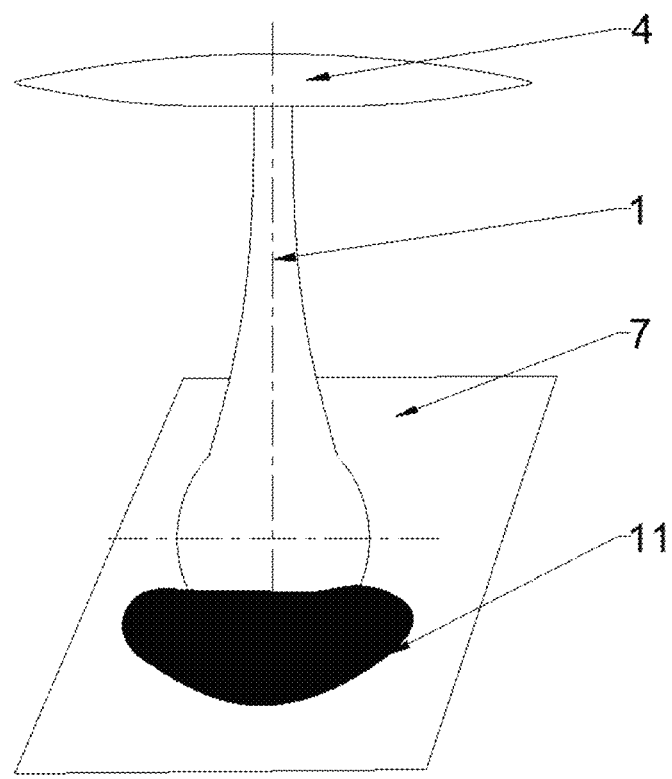
FIG. 13 is the schematic diagram of the bionic sweat gland implanted into the bionic skin according to embodiment 7 of the present disclosure.

As shown in FIG. 13, embodiment 7 is an installation method of the bionic sweat glands in the bionic skin 7 described in the present disclosure. The bionic sweat glands are installed inside the bionic skin 7 or on the bionic skin surface by bonding. Specifically, nano clay, hydrogel, and other adhesive substances 11 are used to smear the surface of bionic skin 7 to make the bottom of bionic sweat glands adhere to the surface of bionic skin. Apply bionic sweat glands for fixation, and then adhere to the surface of intelligent skin. The corresponding pores can be processed on the simulated surface as well. The pores are slightly larger than the sweat gland device. Place the sweat gland device, and then pour hydrogel into the pores to fix them, as shown in FIG. 14.

Figure 14:
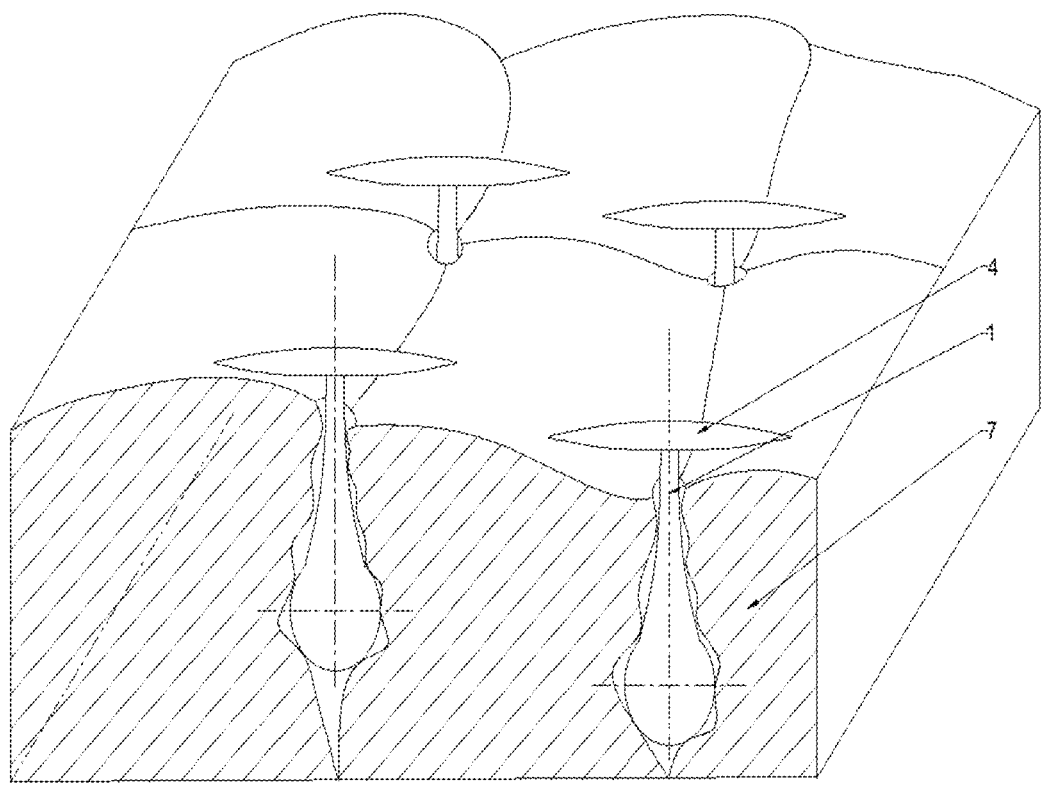
FIG. 14 is the schematic diagram of the bionic sweat gland implanted into the bionic skin according to embodiment 8 of the present disclosure.

As shown in FIG. 14, embodiment 8 is an installation method of the bionic sweat glands in the bionic skin 7 described in the present disclosure. In FIG. 14, the pores of the bionic skin 7 are narrow at the top and wide at the bottom. The pore itself is made of bionic skin and has a certain softness. The diameter of the pore opening is smaller than the expanded evaporation end of the sweat gland device so that the sweat gland device will not fall off after being implanted into the pore. The diameter below the pores is slightly smaller than that of sweat glands, which also causes the corresponding internal force to fix the sweat glands after the sweat glands cut into the pores.

Figure 15:
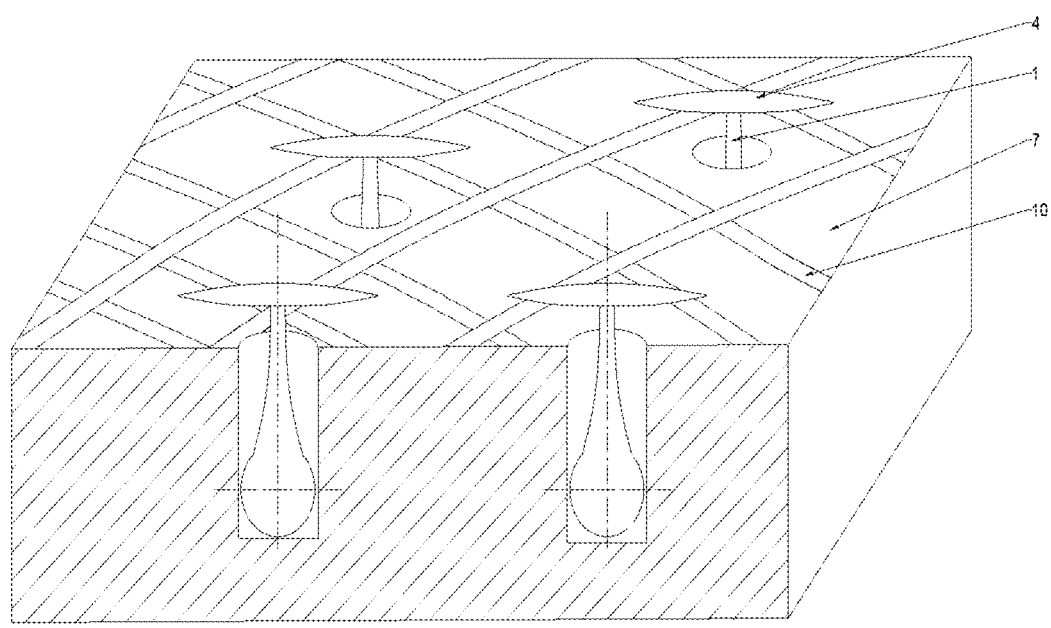
FIG. 15 is the schematic diagram of the bionic sweat gland implanted into the bionic skin according to embodiment 9 of the present disclosure.

As shown in FIG. 15, embodiment 9 is an installation method of the bionic sweat gland in the bionic skin 7 according to the present disclosure. Shell 1 of the bionic sweat gland is woven and fixed inside the bionic skin 7, and the end cover 4 is located outside the bionic skin 7. Weaving fixation adopts the processing technology of textile discipline, and the bionic sweat glands are woven on the surface of bionic skin 7. The specific method is as follows: firstly, the corresponding pores are processed on the surface of the bionic skin 7, and then the sweat gland device is put into the sweat gland device. A layer of the grid pattern is woven on the skin surface to fix the sweat gland device in the hole. The diameter of the hole is slightly wider than that of the sweat gland device. After the bionic sweat gland is put into the pores, the upper part of the shell and the lower part of the end cover are crossed and fixed through the woven material 10 to limit the freedom of the sweat gland device.

Figure 16:
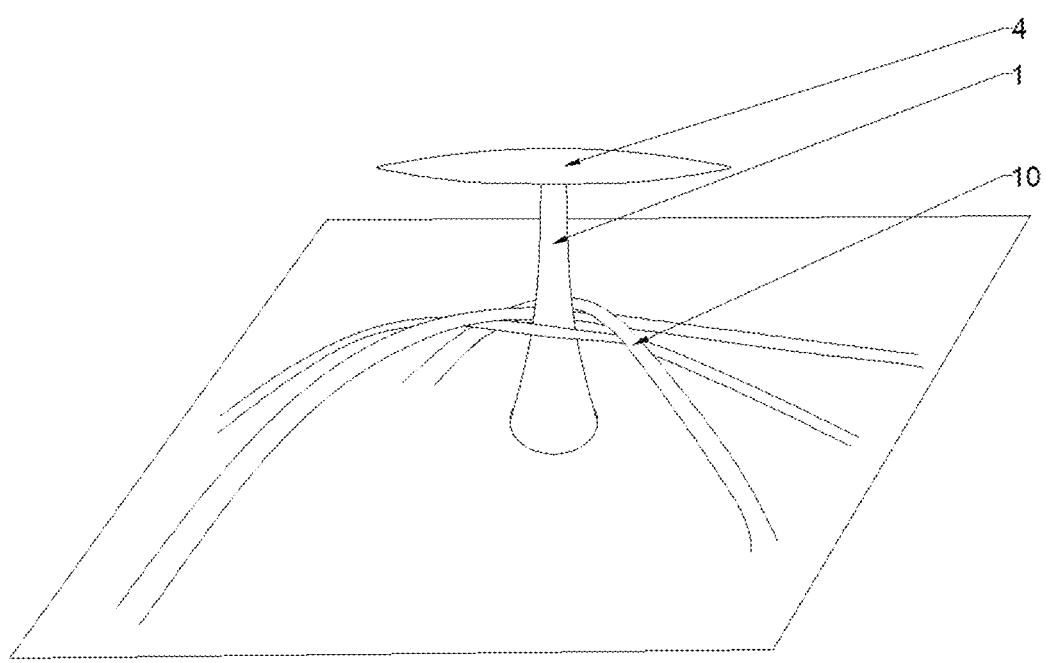
FIG. 16 is the schematic diagram of the bionic sweat gland implanted into the bionic skin according to embodiment 10 of the present disclosure.

As shown in FIG. 16, embodiment 10 is an installation method of the bionic sweat gland in the bionic skin 7 according to the present disclosure. According to the structure and appearance of the bionic sweat glands, when the bionic sweat glands are placed on the surface of the bionic skin 7, the expanded bottom end of the sweat glands will contact the surface of the bionic skin 7. The bionic sweat glands will be fixed on the bionic skin 7 in a position perpendicular to the bionic skin surface through the surrounding woven material 10.

The present disclosure claimed is:

It should be understood that although this specification is described in accordance with various embodiments, not each embodiment contains only one independent technical solution. Since this description is only for clarity, the skilled in this field of technology should take the specification as a whole. The technical solutions in the embodiments can also be appropriately combined to form other embodiments that can be understood by those skilled in this field of technology.

The series of detailed descriptions listed above are only specific descriptions for the feasible embodiments of the present disclosure, and they are not used to limit the protection scope of the present disclosure. Any equivalent embodiments or changes not deviating from the technical spirit of the present disclosure shall be included in the protection scope of the present disclosure.

What is claimed is:

1. A bionic sweat gland, comprising:
    a shell, a porous medium, and an end cover;
    wherein the shell forms a heat dissipation pipe, and the heat dissipation pipe is filled with the porous medium;
        pores formed by the porous medium in the heat dissipation pipe gradually decrease along an evaporation flow direction and a gap of the porous medium is filled with an evaporation liquid;

wherein the shell is a permeable structure, which is used to absorb the evaporation liquid from the environment; a top of the shell is provided with a number of through holes for discharging the evaporation liquid to an outside.

2. The bionic sweat gland according to claim 1, wherein the porous medium is hydrogel particles and a diameter of the hydrogel particles gradually decreases along the evaporation flow direction; the pores formed by the porous medium are not greater than 40 μm.

3. The bionic sweat gland according to claim 1, wherein the shell is in a shape of water droplets; a bottom of the shell is spherical and the top of the shell gradually shrinks along the evaporation flow direction.

4. The bionic sweat gland according to claim 1,
wherein the shell is a double-layer permeable structure, and the shell comprises a permeable inner layer and a permeable outer layer; the permeable inner layer and the permeable outer layer are both grid structures;
wherein mesh pores of the permeable inner layer are smaller than a minimum diameter of the porous medium and mesh pores of the permeable outer layer are larger than those of the permeable inner layer; a mesh of the permeable inner layer and a mesh of the permeable outer layer are staggered.

5. The bionic sweat gland according to claim 1, wherein a strainer is arranged between the through holes on the top of the shell.

6. The bionic sweat gland according to claim 1, wherein the top of the shell is installed with the end cover, a number of micro heat pipes are distributed inside the end cover, and one end of the micro heat pipe is connected with the through holes on the top of the shell; the other end of the micro heat pipe is connected with the outside.

7. The bionic sweat gland according to claim 6, wherein the end cover is a flat oval, and several of the micro heat pipes are distributed in the end cover according to Murray's law.

8. A bionic skin, wherein the bionic sweat gland according to claim 1 is implanted in the bionic skin.

9. The bionic skin according to claim 8,
wherein the bionic skin wraps the shell and the through holes on the top of the shell is located outside the bionic skin;
wherein the bionic skin is provided with a main pipeline for supplementing the evaporation liquid inside the bionic skin in an area near the bionic sweat gland; the shell absorbs the evaporation liquid from an interior of the bionic skin.

10. The bionic skin according to claim 9, wherein the shell of the bionic sweat gland is connected with a nearby main pipeline through a liquid filling thin tube.

11. A bionic sweat gland, comprising:
an end cover, a micro heat pipe, a return pipeline, and a shell;
wherein the end cover and the shell are sealed and connected; a center of the end cover is provided with a liquid inlet chamber; a number of micro heat pipes are distributed inside the end cover and one end of any micro heat pipe is connected with the liquid inlet chamber;
wherein the shell internally provides a heat dissipation pipe connected with the liquid inlet chamber, and the heat dissipation pipe is filled with a porous media; pores formed by the porous media in the heat dissipation pipe gradually decrease along an evaporation flow direction;
wherein a gap of the porous media is filled with an evaporation liquid; the other end of the micro heat pipe is connected with the shell through the return pipeline.

12. The bionic sweat gland according to claim 11, wherein the porous medium is hydrogel particles, a diameter of the hydrogel particles gradually decreases along the evaporation flow direction, and the pores formed by the porous media are not greater than 40 μm.

13. The bionic sweat gland according to claim 11, wherein the end cover is a flat oval, and several of the micro heat pipes are distributed in the end cover according to Murray's law.

14. The bionic sweat gland according to claim 11, wherein a filter screen is arranged between the shell and the liquid inlet chamber.

15. The bionic sweat gland according to claim 11, wherein the shell is in a shape of water droplets; a bottom of the shell is spherical and a top of the shell gradually shrinks along the evaporation flow direction.

16. The bionic sweat gland according to claim 11, wherein the shell is a cylinder or a cuboid.

17. The bionic sweat gland according to claim 11, wherein the shell is a spiral structure or a coil structure.

18. A bionic skin, wherein the bionic sweat gland according to claim 11 is implanted in the bionic skin.

19. The bionic skin according to claim 18, wherein when a heat source on the bionic skin is point distributed, the bionic sweat glands are uniformly distributed around the point heat source; when the heat source on the bionic skin is surface distributed, a bionic sweat gland array is uniformly distributed on a surface heat source plane.

20. The bionic skin according to claim 18, wherein the shell of the bionic sweat gland is bonded or woven and fixed on an interior or a surface of the bionic skin; the end cover is located outside the bionic skin.

* * * * *